(12) United States Patent
Fowler et al.

(10) Patent No.: US 11,074,075 B2
(45) Date of Patent: Jul. 27, 2021

(54) WAIT INSTRUCTION FOR PREVENTING EXECUTION OF ONE OR MORE INSTRUCTIONS UNTIL A LOAD COUNTER OR STORE COUNTER REACHES A SPECIFIED VALUE

(71) Applicant: Advanced Micro Devices, Inc., Sunnyvale, CA (US)

(72) Inventors: Mark Fowler, Hopkinton, MA (US); Brian D. Emberling, Palo Alto, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 240 days.

(21) Appl. No.: 15/442,412

(22) Filed: Feb. 24, 2017

(65) Prior Publication Data
US 2018/0246724 A1  Aug. 30, 2018

(51) Int. Cl.
*G06F 9/30* (2018.01)
*G06F 9/38* (2018.01)

(52) U.S. Cl.
CPC ........ *G06F 9/30087* (2013.01); *G06F 9/3009* (2013.01); *G06F 9/3834* (2013.01); *G06F 9/3838* (2013.01); *G06F 9/3851* (2013.01)

(58) Field of Classification Search
CPC ............................ G06F 9/30087; G06F 9/3838
See application file for complete search history.

(56) References Cited

U.S. PATENT DOCUMENTS

| 5,933,627 | A | * | 8/1999 | Parady | G06F 9/3851 711/122 |
| 5,961,630 | A | * | 10/1999 | Zaidi | G06F 9/3834 712/200 |
| 6,470,443 | B1 | | 10/2002 | Emer et al. | |

(Continued)

FOREIGN PATENT DOCUMENTS

| CA | 2447425 A1 * | 11/2002 | ......... G06F 9/30043 |
| WO | 2008027823 A1 | 3/2008 | |
| WO | 2008117008 A1 | 10/2008 | |

OTHER PUBLICATIONS

European Search Report in European Application No. 17159096.1, dated Aug. 24, 2017, 4 pages.

(Continued)

*Primary Examiner* — David J. Huisman
(74) *Attorney, Agent, or Firm* — Kowert Hood Munyon Rankin and Goetzel PC; Rory D. Rankin

(57) ABSTRACT

Systems, apparatuses, and methods for maintaining separate pending load and store counters are disclosed herein. In one embodiment, a system includes at least one execution unit, a memory subsystem, and a pair of counters for each thread of execution. In one embodiment, the system implements a software based approach for managing dependencies between instructions. In one embodiment, the execution unit(s) maintains counters to support the software-based approach for managing dependencies between instructions. The execution unit(s) are configured to execute instructions that are used to manage the dependencies during run-time. In one embodiment, the execution unit(s) execute wait (Continued)

instructions to wait until a given counter is equal to a specified value before continuing to execute the instruction sequence.

9 Claims, 7 Drawing Sheets

(56) References Cited

U.S. PATENT DOCUMENTS

| | | | |
|---|---|---|---|
| 6,473,832 B1 | 10/2002 | Ramagopal et al. | |
| 6,481,251 B1 | 11/2002 | Meier et al. | |
| 7,877,559 B2 | 1/2011 | Lauterbach | |
| 8,127,057 B2 | 2/2012 | Chung et al. | |
| 2005/0154805 A1* | 7/2005 | Steely, Jr. | G06F 9/30043 710/52 |
| 2008/0059966 A1 | 3/2008 | Du et al. | |
| 2010/0250802 A1* | 9/2010 | Waugh | G06F 13/4022 710/100 |
| 2011/0035561 A1* | 2/2011 | Zeffer | G06F 9/3004 711/156 |
| 2013/0125097 A1* | 5/2013 | Ebcioglu | G06F 17/5045 717/136 |
| 2014/0181349 A1* | 6/2014 | Balkan | G06F 13/4027 710/310 |
| 2014/0215190 A1 | 7/2014 | Mylius et al. | |
| 2015/0220341 A1 | 8/2015 | Ohannessian, Jr. et al. | |
| 2016/0139829 A1* | 5/2016 | Sanzone | G06F 12/0811 711/122 |

OTHER PUBLICATIONS

Communication pursuant to Article 94(3) in European Application No. 17159096.1, dated Sep. 25, 2017, 8 pages.
Communication pursuant to Article 94(3) EPC in European Application No. 17159096.1, dated Apr. 16, 2018, 8 pages.
International Search Report and Written Opinion in International Application No. PCT/US2018/019517, dated May 3, 2018, 9 pages.

* cited by examiner

WAIT INSTRUCTION FOR PREVENTING EXECUTION OF ONE OR MORE INSTRUCTIONS UNTIL A LOAD COUNTER OR STORE COUNTER REACHES A SPECIFIED VALUE

BACKGROUND

Description of the Related Art

Processors include support for load memory operations and store memory operations to facilitate transfer of data between the processors and memory to which the processors are coupled. Generally speaking, a load memory operation is an operation specifying a transfer of data from a memory location to the processor. A memory location refers to a location in a memory hierarchy, with the memory hierarchy including one or more levels of cache and/or one or more levels of memory. A store memory operation is an operation specifying a transfer of data from the processor to a location in the memory hierarchy.

As used herein, the term "instruction" refers to information indicative of one or more operations to be performed by a processor. An "operation" can include a processing element doing nothing during a given processing cycle (e.g., based on a "nop" or "no-operation" instruction or a conditional instruction for which the condition is false). An instruction can be defined by a given instruction set architecture (ISA). An instruction can also be defined by a microarchitecture rather than tied to a particular ISA. For example, an ISA instruction can be decoded into one or more micro-operations, which can also be referred to as "instructions" when they specify an operation to be performed by a processor. Thus, a "store instruction" might or might not be defined by an ISA. A store instruction includes information indicative that a store operation is to be performed and typically includes information indicating a store's target memory location.

Load and store memory operations can be an implicit part of an instruction which includes a memory operation, or can be explicit instructions, in various implementations. "Load memory operations" are also referred to herein as "load instructions" or "load operations". Similarly, "store memory operations" are also referred to herein as "store instructions" or "store operations". It is noted that the term "load operation" or "store operation" can also refer to an "atomic operation". An atomic operation performs an arithmetic combination of data from a register location with data from a memory location. It is also noted that the term "load operation" can also be used to refer to a "sample operation". A sample operation applies filtering to a data value, using sampler constants, after the data value is read from a memory location.

Many load and store operations have dependencies on other operations, especially in multi-threaded programming environments when multiple threads share data. Determining when to execute these loads and stores based on when the dependencies have been resolved can be challenging.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for maintaining separate pending load and store counters are disclosed herein. In one embodiment, a system includes at least one execution unit, a memory subsystem, and a pair of counters for each execution thread. In one embodiment, the system implements a software-based approach for managing dependencies between instructions. In one embodiment, the system maintains counters to support the software-based approach for managing dependencies between instructions. The system is configured to execute instructions which are used to manage the dependencies during run-time by referencing the values of the counters.

In one embodiment, the system is configured to increment a first counter of a first execution unit responsive to detecting a load instruction of a first thread being executed. The system is also configured to decrement the first counter responsive to determining data of the load instruction has been retrieved from the memory subsystem. Additionally, the system is configured to increment a second counter of the first execution unit responsive to detecting a store instruction of the first thread being executed. Also, the system is configured to decrement the second counter responsive to receiving an acknowledgement from the memory subsystem that the store instruction has completed. The store instruction has completed when data of the store instruction is written to the memory subsystem and when the data is visible to other threads. The first execution unit is configured to execute a wait instruction to wait until a given counter is equal to a given value, wherein the given value is specified in the wait instruction.

Figure 1:
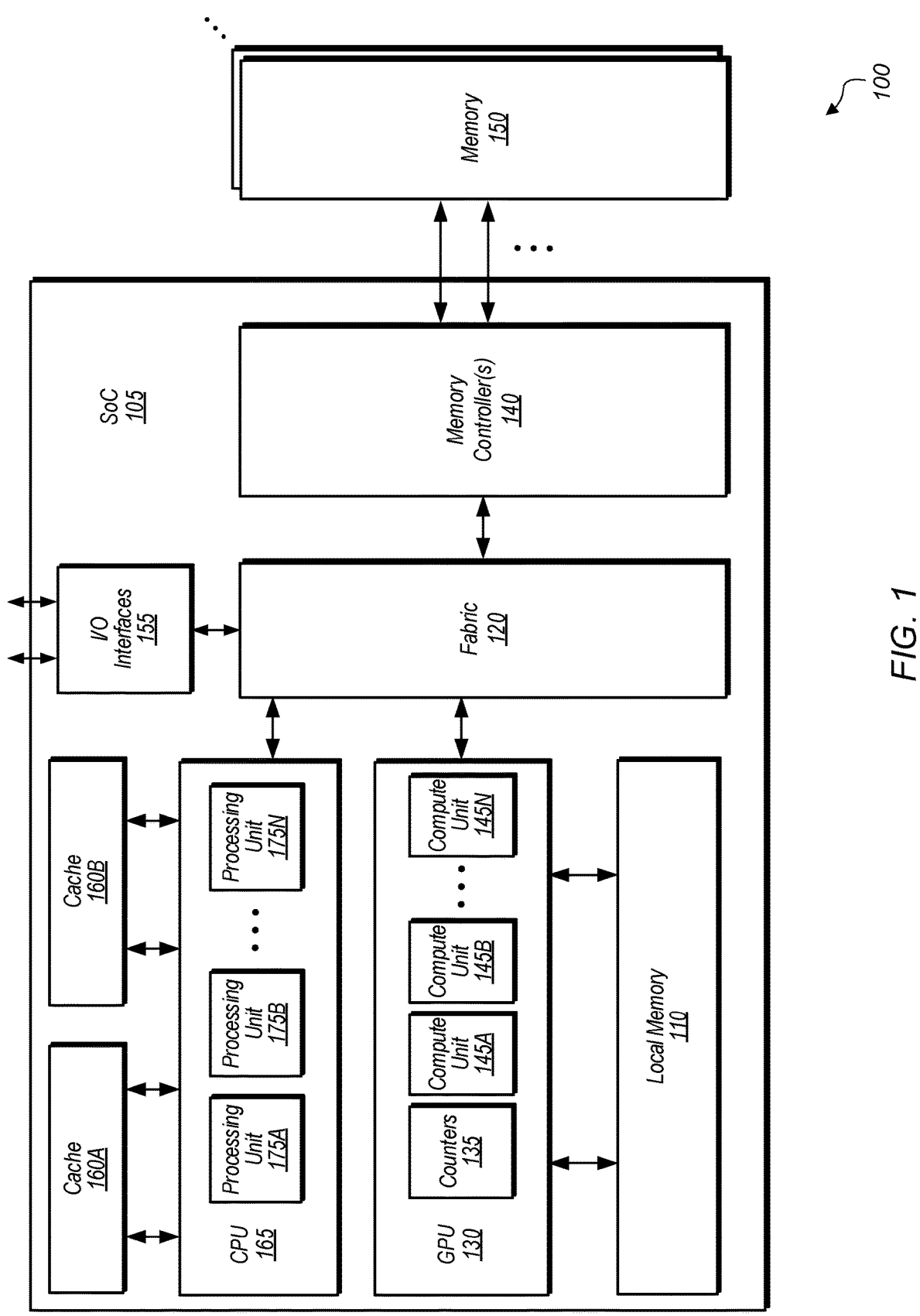
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 175A-N of central processing unit (CPU) 165, input/output (I/O) interfaces 155, caches 160A-B, fabric 120, graphics processing unit (GPU) 130, local memory 110, and memory controller(s) 140. SoC 105 can also include other components not shown in FIG. 1 to avoid obscuring the figure. Processing units 175A-N are representative of any number and type of processing units. In one embodiment, processing units 175A-N are CPU cores. In another embodiment, one or more of processing units 175A-N are other types of processing units (e.g., application specific integrated circuit (ASIC), field programmable gate array (FPGA), digital signal processor (DSP)). Processing units 175A-N of CPU 165 are coupled to caches 160A-B and fabric 120.

In one embodiment, processing units 175A-N are configured to execute instructions of a particular instruction set architecture (ISA). Each processing unit 175A-N includes one or more execution units, cache memories, schedulers, branch prediction circuits, and so forth. In one embodiment, the processing units 175A-N are configured to execute the main control software of system 100, such as an operating system. Generally, software executed by processing units 175A-N during use can control the other components of system 100 to realize the desired functionality of system 100. Processing units 175A-N can also execute other software, such as application programs.

GPU 130 includes at least counters 135 and compute units 145A-N which are representative of any number and type of compute units that are used for graphics or general-purpose processing. Each compute unit 145A-N includes any number of execution units, with the number of execution units per compute unit varying from embodiment to embodiment. GPU 130 is coupled to local memory 110 and fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 utilizes counters 135 to implement a software-based approach for managing dependencies between instructions. The compute units 145 of GPU 130 are configured to execute instructions that are used to manage the dependencies during run-time. In one embodiment, the compute units 145 of GPU 130 execute wait instructions to wait until a given counter is equal to a specified value before continuing to execute the instruction sequence.

In one embodiment, GPU 130 is configured to increment a first counter of counters 135 responsive to detecting a load instruction of a first thread being executed. GPU 130 is also configured to decrement the first counter responsive to determining data of the load instruction has been retrieved from the memory subsystem. Additionally, GPU 130 is configured to increment a second counter of counters 135 responsive to detecting a store instruction of the first thread being executed. Also, GPU 130 is configured to decrement the second counter responsive to receiving an acknowledgement from cache or memory that the store instruction has completed. The store instruction has completed when data of the store instruction is written to the cache or memory and when the data is visible to other threads. GPU 130 is configured to execute a wait instruction to wait until a given counter is equal to a given value, wherein the given value is specified in the wait instruction.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 175A-N and/or compute units 145A-N. In some embodiments, SoC 105 includes caches 160A-B that are utilized by processing units 175A-N. In one embodiment, caches 160A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
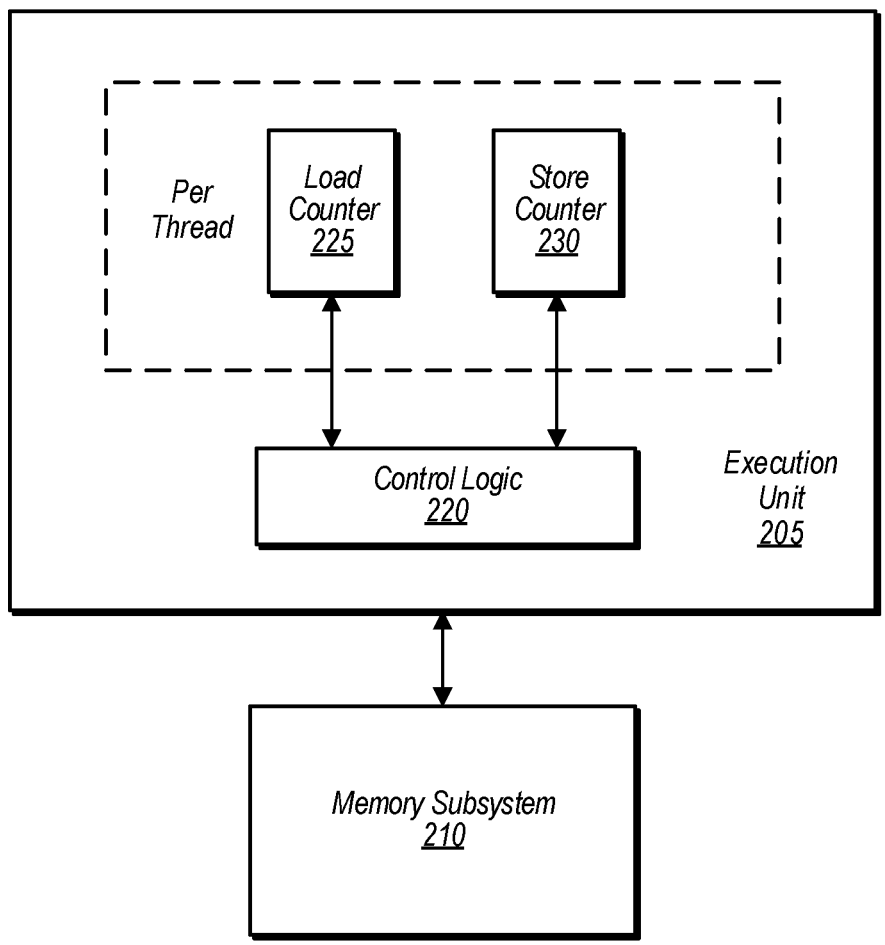
FIG. 2 is a block diagram of one embodiment of an execution unit.

Turning now to FIG. 2, a block diagram of one embodiment of an execution unit 205 is shown. In one embodiment, execution unit 205 includes at least control logic 220, load counter 225, and store counter 230. In one embodiment, multiple execution units 205 can be implemented within each of the compute units 145A-N (of FIG. 1). It is noted that the term "load counter" can also be referred to as a "vector memory load counter". Similarly, the term "store counter" can also be referred to as a "vector memory store counter". It is also noted that execution unit 205 maintains a separate pair of load and store counters for each thread of execution.

Execution unit 205 is coupled to memory subsystem 210, with memory subsystem 210 including any number and type of caches and/or memory devices. For example, in one embodiment, memory subsystem 210 includes a level one (L1) cache, a level two (L2) cache, and a system memory. In other embodiments, memory subsystem 210 can include other numbers of cache levels and/or other types of memory.

In one embodiment, when execution unit 205 executes a load instruction, execution unit 205 increments load counter 225. When the data of the load instruction is retrieved from memory subsystem 210 and is available within execution unit 205, then execution unit 205 decrements load counter 225. When execution unit 205 executes a store instruction, execution unit 205 increments store counter 230. When execution unit 205 receives an acknowledgement from memory subsystem 210 that the store instruction has been completed, then execution unit 205 decrements store counter 230. Execution unit 205 is configured to execute wait instructions which specify waiting to execute subsequent instructions until a specified counter is equal to a given value. For example, in one embodiment, a wait instruction specifies waiting until load counter 225 is equal to zero. Wait instructions can also specify that execution unit 205 waits until a specified counter is equal to a non-zero value.

Figure 3:
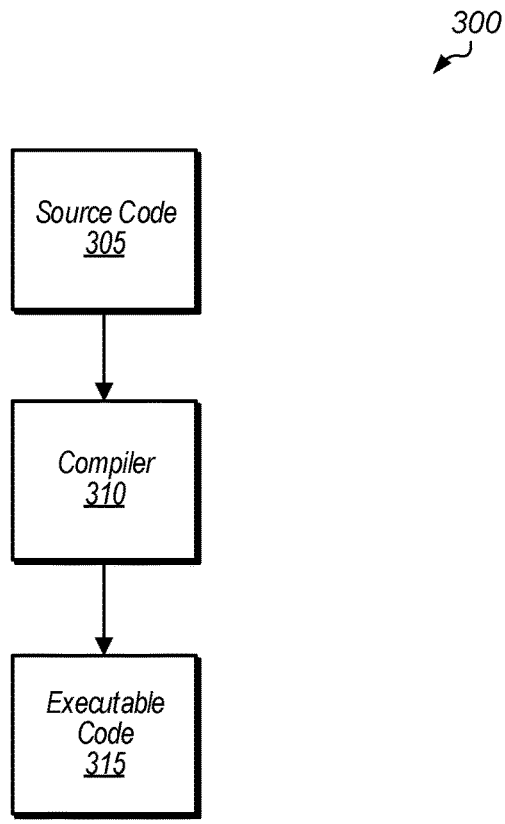
FIG. 3 is a block diagram of one embodiment of a software environment.

Referring now to FIG. 3, a block diagram of one embodiment of a software environment 300 is shown. In one embodiment, software environment 300 is utilized to generate executable code 315 which can execute on a computing system (e.g., computing system 100 of FIG. 1). A compiler 310 is configured to receive source code 305 and compile source code 305 into executable code 315. When compiler 310 performs optimizations on source code 305, compiler 310 has the flexibility to insert a variety of wait instructions into the executable code 315.

In one embodiment, compiler 310 inserts wait instructions in executable code 315 to manage software dependencies between instructions in a multi-threaded execution environment. When compiler 310 inserts a given wait instruction into the executable code 315, the given wait instruction identifies the corresponding load or store counter for the given thread. The wait instruction also identifies the value to wait for before execution is allowed to continue. For example, in one embodiment, the wait instruction can specify a non-zero count value to wait for, and when the specified counter reaches the specified non-zero count value, a subsequent instruction from the instruction sequence can be executed.

Figure 4:
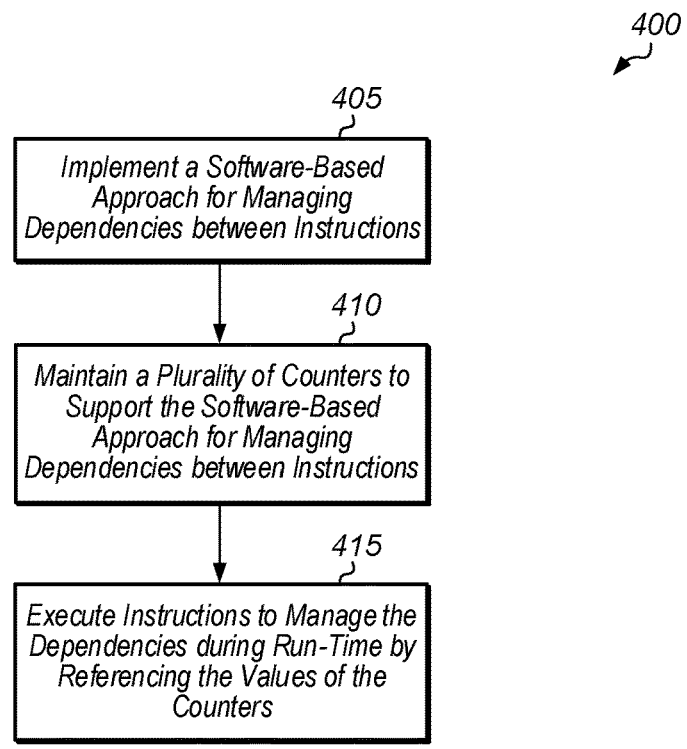
FIG. 4 is a generalized flow diagram illustrating one embodiment of a method for implementing a software-based approach for managing dependencies between instructions.
Figure 5:
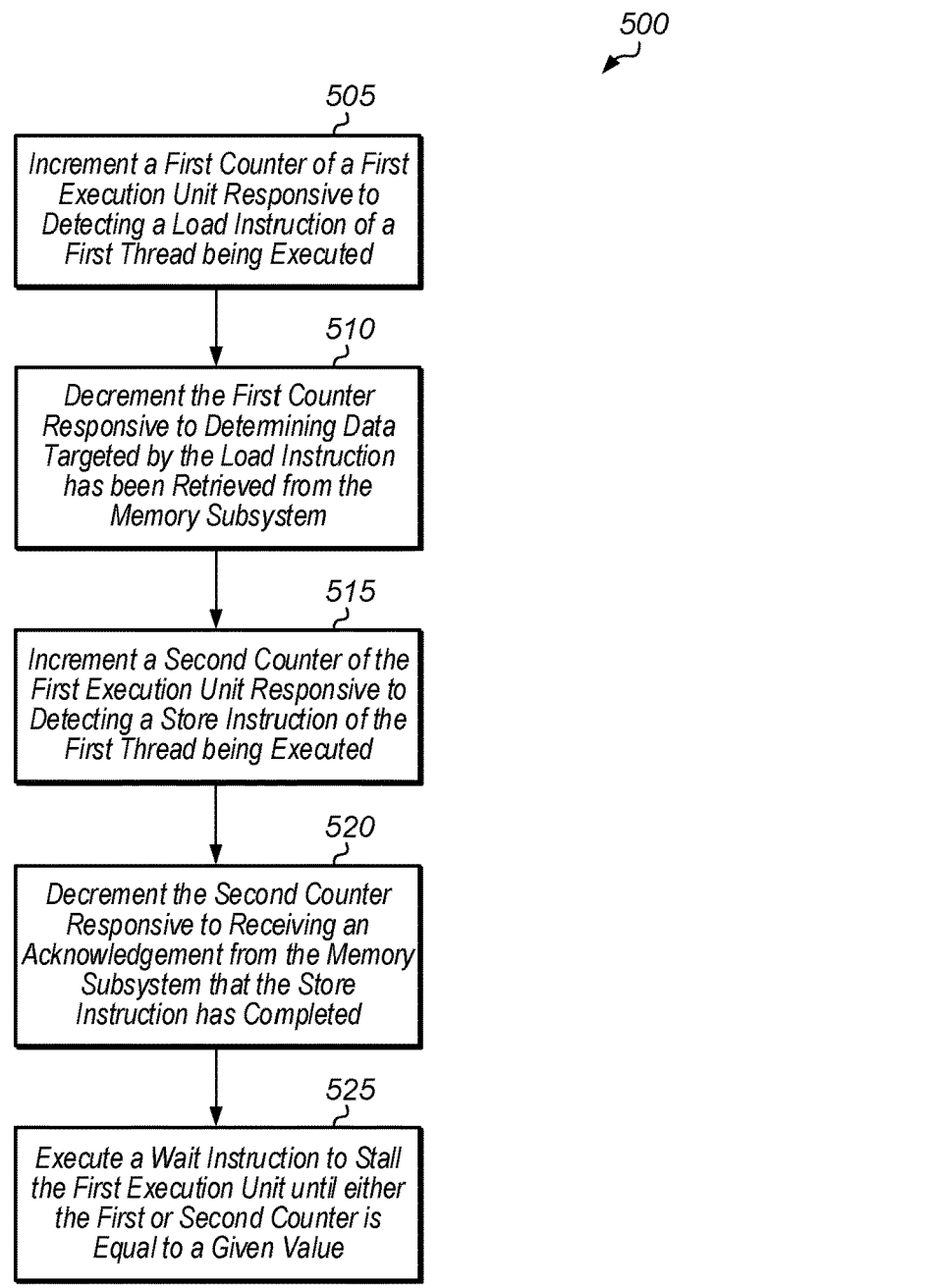
FIG. 5 is a generalized flow diagram illustrating one embodiment of a method for managing pending load and store counters.
Figure 6:
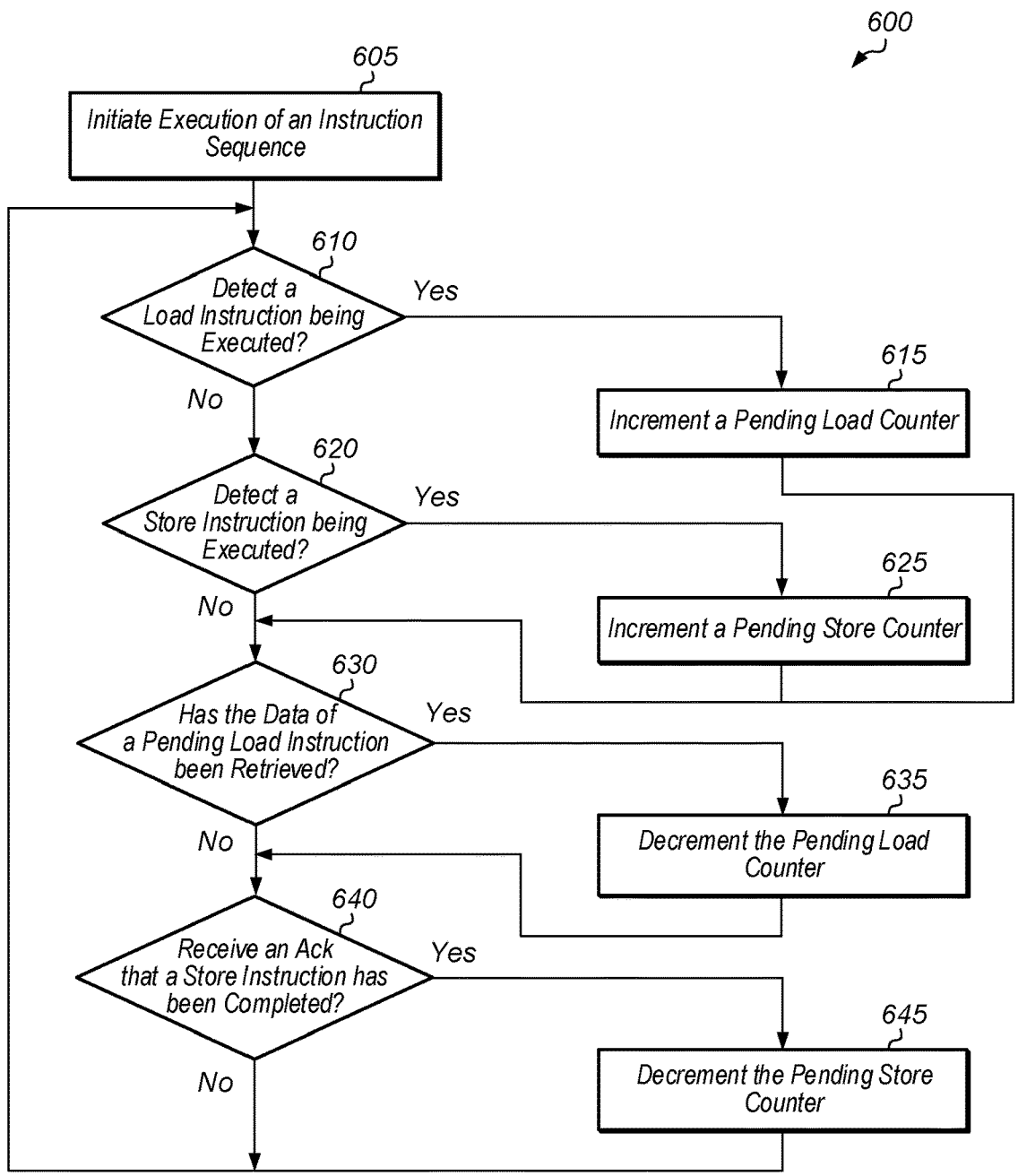
FIG. 6 is a generalized flow diagram illustrating one embodiment of a method for tracking pending load and store operations separately.
Figure 7:
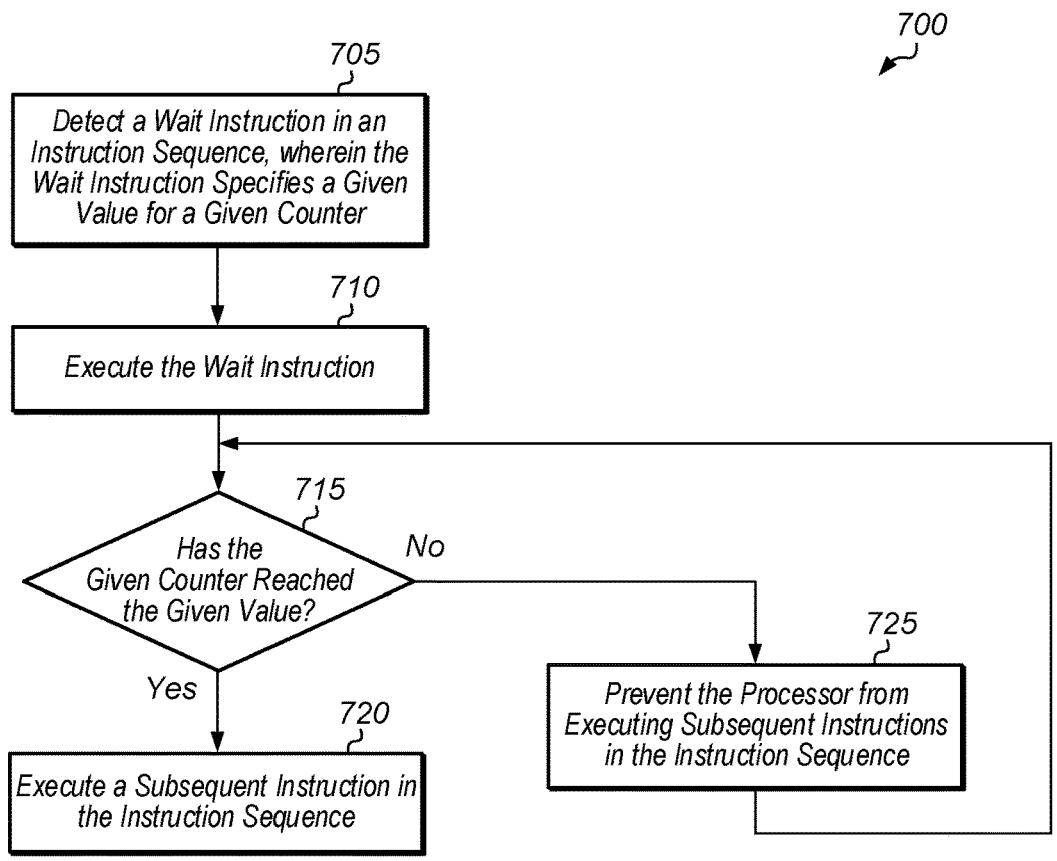
FIG. 7 is a generalized flow diagram illustrating one embodiment of a method for implementing a wait instruction.

Turning now to FIG. 4, one embodiment of a method 400 for implementing a software-based approach for managing dependencies between instructions is shown. For purposes of discussion, the steps in this embodiment and those of FIGS. 5-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

A system implements a software-based approach for managing dependencies between instructions (block 405). In one embodiment, the system (e.g., system 100 of FIG. 1) includes at least one execution unit and a memory subsystem. The system can also include any number of other components depending on the embodiment. The system maintains a plurality of counters to support the software-based approach for managing dependencies between instructions (block 410). In one embodiment, the system maintains a pair of counters for each thread of execution, with a first counter tracking a number of pending store instructions and a second counter tracking a number of pending load instructions. The execution unit(s) of the system are configured to execute instructions to manage the dependencies during run-time by referencing the values of the counters (block 415). After block 415, method 400 ends.

Referring now to FIG. 5, one embodiment of a method 500 for managing pending load and store counters is shown. A system is configured to increment a first counter of a first execution unit responsive to detecting a load instruction of a first thread being executed (block 505). Also, the system is configured to decrement the first counter responsive to determining data targeted by the load instruction has been retrieved from the memory subsystem (block 510). Additionally, the system is configured to increment a second counter of the first execution unit responsive to detecting a store instruction of the first thread being executed (block 515). Still further, the system is configured to decrement the second counter responsive to receiving an acknowledgement from the memory subsystem that the store instruction has completed (block 520). Also, the system is configured to execute a wait instruction to stall the first execution unit until either the first or second counter is equal to a given value (block 525). After block 525, method 500 ends.

Turning now to FIG. 6, one embodiment of a method 600 for tracking pending load and store instructions separately is shown. An execution unit initiates execution of an instruction sequence (block 605). In one embodiment, the execution unit executes a multi-threaded instruction sequence that interleaves store and load instructions. If the execution unit detects a load instruction being executed (conditional block 610, "yes" leg), then the execution unit increments a pending load counter (block 615). If the execution unit detects a store instruction being executed (conditional block 620, "yes" leg), then the execution unit increments a pending store counter (block 625). Also, if the execution unit receives an indication that the data of a pending load instruction has been retrieved from the memory subsystem (conditional block 630, "yes" leg), then the execution unit decrements the pending load counter (block 635). Additionally, if the execution unit receives an acknowledgment from the memory subsystem that a store instruction has been completed (conditional block 640, "yes" leg), then the execution unit decrements the pending store counter (block 645). After block 645, method 600 returns to block 610.

Referring now to FIG. 7, one embodiment of a method 700 for implementing a wait instruction is shown. A processor detects a wait instruction in an instruction sequence, wherein the wait instruction specifies a given value for a given counter (e.g., load counter, store counter) (block 705). Next, the processor executes the wait instruction (block 710). If the given counter has reached the given value (conditional block 715, "yes" leg), then the processor executes a subsequent instruction in the instruction sequence (block 720). After block 720, method 700 ends. If the given counter has not reached the given value (conditional block 715, "no" leg), then the processor is prevented from executing subsequent instructions in the instruction sequence (block 725). In one embodiment, the processor is prevented from executing only certain types of instructions (e.g., load instructions, store instructions) in block 725. After block 725, method 700 returns to conditional block 715.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory subsystem; and
one or more execution units, wherein a first execution unit of the one or more execution units comprises a plurality of pairs of counters for each of a plurality of threads of execution of the first execution unit, wherein each pair of counters includes a pending load counter and a pending store counter for a given thread;
wherein the system is configured to:
increment the pending load counter of a first pair of the plurality of pairs of counters responsive to detecting a load instruction of a first thread being executed;
decrement the pending load counter of the first pair responsive to determining data targeted by the load instruction has been retrieved from the memory subsystem;
increment the pending store counter of the first pair responsive to detecting a store instruction of the first thread being executed; and
decrement the pending store counter of the first pair responsive to receiving an acknowledgement from the memory subsystem that the store instruction has completed; and
wherein the first execution unit is configured to execute a first wait instruction that includes a first value settable to any of a zero or non-zero value which prevents execution of one or more instructions until the pending load counter of the first pair is equal to the first value included in the first wait instruction.

2. The system as recited in claim 1, wherein the first execution unit is configured to execute a second wait instruction that includes a second value settable to any of a zero or non-zero value which prevents execution of one or more instructions until the pending store counter of the first pair is equal to the second value included in the second wait instruction.

3. The system as recited in claim 2, wherein the pending store counter of the first pair is specified in the second wait instruction.

4. A method comprising:
maintaining a plurality of pairs of counters for each of a plurality of threads of execution of an execution unit, wherein each pair of counters includes a load counter and a store counter;
incrementing the load counter of a first pair of the plurality of pairs of counters responsive to detecting a load instruction of a first thread being executed;
decrementing the load counter of the first pair responsive to determining data targeted by the load instruction has been retrieved from a memory subsystem;
incrementing the store counter of the first pair responsive to detecting a store instruction of the first thread being executed;
decrementing the store counter of the first pair responsive to receiving an acknowledgement from the memory subsystem that the store instruction has completed; and
executing a first wait instruction that includes a first value settable to any of a zero or non-zero value which prevents execution of one or more instructions until the load counter of the first pair is equal to the first value included in the first wait instruction.

5. The method as recited in claim 4, further comprising executing a second wait instruction that includes a second value settable to any of a zero or non-zero value which prevents execution of one or more instructions until the store counter of the first pair is equal to the second value included in the second wait instruction.

6. The method as recited in claim 5, wherein the store counter of the first pair is specified in the second wait instruction.

7. An apparatus comprising:
an execution unit comprising a plurality of pairs of counters for each of a plurality of threads of execution of the execution unit, wherein each pair of counters includes a load counter and a store counter;
wherein the execution unit is configured to:
increment the load counter of a first pair of the plurality of pairs of counters responsive to detecting a load instruction of a first thread being executed;
decrement the load counter of the first pair responsive to determining data targeted by the load instruction has been retrieved from a memory subsystem;
increment the store counter of the first pair responsive to detecting a store instruction of the first thread being executed;
decrement the store counter of the first pair responsive to receiving an acknowledgement from the memory subsystem that the store instruction has completed; and
execute a first wait instruction that includes a first value settable to any of a zero or non-zero value which prevents execution of one or more instructions until the load counter of the first pair is equal to the first value included in the first wait instruction.

8. The apparatus as recited in claim 7, wherein the execution unit is configured to execute a second wait instruction which prevents execution of one or more instructions until the store counter of the first pair is equal to a second value, wherein the second value is:
specified in the second wait instruction; and
set to any of a zero or non-zero value.

9. The apparatus as recited in claim 8, wherein the store counter of the first pair is specified in the second wait instruction.

* * * * *